United States Patent [19]

Touro et al.

[11] Patent Number: 5,147,617
[45] Date of Patent: Sep. 15, 1992

[54] PROCESS FOR RECOVERY OF GOLD FROM GOLD ORES USING A COMPLEXING PRETREATMENT AND SULFUROUS ACID LEACHING

[75] Inventors: Freddie J. Touro; Tadeusz K. Wiewiorowski, both of New Orleans, La.

[73] Assignee: Freeport-McMoRan Inc., New Orleans, La.

[21] Appl. No.: 703,853

[22] Filed: May 21, 1991

[51] Int. Cl.$^5$ .......................... C01G 7/00; C22B 3/06; C22B 11/06

[52] U.S. Cl. ........................................ 423/27; 423/28; 423/36; 423/37; 423/39; 75/736

[58] Field of Search .................. 423/27, 28, 36, 37, 423/39; 75/736

[56] References Cited

U.S. PATENT DOCUMENTS

| | | | |
|---|---|---|---|
| 3,235,328 | 2/1966 | Lerner et al. | 423/60 |
| 4,289,532 | 9/1981 | Matson et al. | 75/105 |
| 4,552,589 | 11/1985 | Mason et al. | 75/105 |
| 4,662,938 | 5/1987 | Whitney et al. | 423/39 |
| 4,668,289 | 5/1987 | Langer, et al. | 423/27 |
| 4,723,998 | 2/1988 | O'Neil | 75/101 |
| 4,738,718 | 4/1988 | Bakshani et al. | 75/105 |
| 4,902,345 | 2/1990 | Ball et al. | 423/27 |
| 4,919,715 | 4/1990 | Smith et al. | 75/423 |
| 5,051,128 | 9/1991 | Kubo | 75/736 |
| 5,055,199 | 10/1991 | O'Neill, et al. | 423/29 |

FOREIGN PATENT DOCUMENTS 3740680 6/1989 European Pat. Off. .............. 423/27

Primary Examiner—Theodore Morris
Assistant Examiner—P. L. Hailey
Attorney, Agent, or Firm—Fisher, Christen & Sabol

[57] ABSTRACT

A process for recovering gold from gold-bearing ores includes the steps of forming a slurry of ground ore and treating the ore with an oxidizing and complexing agent such as hydrogen sulfide or a sulfide salt. A chelating agent, $SO_2$, air, and an anion exchange resin are added to the slurry to subject the ore to a simultaneous sulfurous acid leaching and anion exchange resin adsorption step in the presence of dissolved oxygen. The gold transfers to the resin which is then removed from the slurry. The gold is then separated from the resin by chemical stripping. Alternately, the ground ore is blended with an oxidizing agent such as calcium hypochlorite and then with a gold-complexing agent. The ore blend is slurried in water, with the addition of a chelating agent, $SO_2$, air and an anion exchange resin to effect the leaching and adsorption of gold values.

52 Claims, 1 Drawing Sheet

PROCESS FOR RECOVERY OF GOLD FROM GOLD ORES USING A COMPLEXING PRETREATMENT AND SULFUROUS ACID LEACHING

FIELD OF THE INVENTION

This invention relates to a method for the recovery of gold from gold ores using a gold oxidation and complexing pretreatment followed by a gold leaching step using sulfurous acid as the gold leaching agent. More specifically, the invention relates to a process for recovering gold from gold-bearing ores, particularly refractory gold-bearing ores, using an oxidant capable of oxidizing elemental gold and a gold complexing agent to convert the gold values to a sulfurous acid-soluble form and leaching the gold from the ore using sulfurous acid as the leaching agent and resin-in-pulp as a gold adsorbent to recover the gold. A hydrogen sulfide or a hydrogen sulfide salt may be used as the gold complexing agent without the need for a prior gold oxidation step and the pretreatment of the gold ore entails only sulfiding, followed by sulfurous acid leaching of the gold values.

BACKGROUND OF THE INVENTION

Refractory gold ores are ores that are generally not amenable to standard cyanidation gold extraction methods as known in the art. Conventional straight cyanidation gold extraction methods typically facilitate less than about 50% gold extraction when used on refractory gold ores. Gold-bearing ores are often refractory because of their content of organic carbonaceous and/or sulfidic matter which inhibits or substantially reduces extraction of gold using these conventional cyanidation techniques. Such refractory ores may be found in Nevada and other states in the United States, as well as in other countries throughout the world. It is not completely understood, in all instances, why the sulfidic matter and the organic carbonaceous materials cause such ores to be refractory, but the phenomenon and the resistance to conventional cyanidation extraction is well known in the gold mining industry. The gold may also be encapsulated in mineral entities of the ore which are not attacked by conventional cyanidation processes.

A number of processes have been developed to treat refractory gold ores to make the ores more amenable to conventional gold recovery methods. For example, some ores which owe their refractory nature to their content of organic carbonaceous matter can be handled efficiently by using the process taught in commonly assigned U.S. Pat. No. 4,289,532 to Matson et al. This process treats carbonaceous ores with an oxidation step utilizing chlorine to oxidize the carbonaceous matter prior to a cyanide leach step. Although this process was intended primarily to treat ores containing carbonaceous matter, the process has also been found effective in treating gold ores containing low levels of sulfidic compounds in addition to carbonaceous matter. The sulfidic compounds are oxidized by contact with chlorine. However, when high sulfide concentrations are present in the ore, excessive quantities of chlorine are required and the process becomes more costly. Other treatment techniques, such as autoclaving or roasting, may be necessary for ores containing high concentrations of sulfidic compounds.

Two processes utilizing autoclaving to treat refractory ores are described in U.S. Pat. No. 4,552,589 to Mason et al and commonly assigned U.S. Pat. No. 4,738,718 to Bakshani et al. Numerous patents teach roasting processes for handling refractory ores. One such patent is commonly assigned U.S. Pat. No. 4,919,715 to Smith et al. The process of that patent is specifically directed to treating refractory sulfidic and carbonaceous ores.

In addition to the ore treatment steps described, the above-noted processes have the disadvantage of requiring cyanide leach step to recover the gold from the treated ore. While cyanide leaching has been an extremely effective means of recovering gold from most ores, concern about the potential toxic effects of cyanide has been increasing in recent years. For example, tightened tolerance levels of the cyanide content of ground water and discharge water have been set in several states and the trend toward such tightened standards will probably continue. Because of the increased concern over the toxicity of cyanide, considerable research has been directed in recent years toward finding an effective substitute for cyanide in gold leaching operations without sacrificing gold recoveries.

The potential toxicity of cyanide is not the only driving force for research in developing alternative gold leaching agents. As easily processed gold ores become exhausted, refractory ores of various types will have to be handled. Because of the chemical characteristics of some of these refractory ores, cyanide is not always the most effective leaching agent.

Two leaching compounds, acidic thiourea and thiosulfate, have received considerable attention in the gold industry. The two compounds have been found effective for leaching some ores, and ineffective, or uneconomical, for leaching most other ores.

Some attention has also been redirected to chlorine which was the most widely used gold leaching agent prior to being displaced by the more efficient cyanide at the turn of the century. For example, commonly assigned U.S. Pat. No. 4,723,998 to O'Neil uses a simultaneous chlorine leaching and ion exchange resin adsorption procedure to recover gold from carbonaceous ores.

None of the alternative leaching agents and methods discussed above have been sufficiently effective in terms of cost efficiency and gold recoveries to replace cyanide leaching as the universal leaching agent in the gold industry.

There is obviously still a need in the gold mining industry for an effective and efficient leaching agent which can, at least partially, replace or supplement cyanide leaching. The present invention is directed to a new gold recovery method which is effective in recovering gold values from many gold ores, particularly from many refractory gold ores. The gold values are recovered from the gold ore using a pretreatment which renders the gold content of ore amenable to leaching with sulfurous acid.

SUMMARY OF THE INVENTION

The present invention is directed to a process for recovering gold from gold ores, particularly refractory gold-bearing ores which are not otherwise amenable to conventional leaching techniques. The process of this invention comprises pretreatment of the ore to render its gold content amenable to sulfurous acid leaching, followed by leaching the gold values from the ore using sulfurous acid as the leaching agent, as described in copending Patent Application entitled Process For Recovery Of Gold From Refractory Gold Ores Using Sulfurous Acid As the Leaching Agent. The process of this invention entails treating a gold ore with an oxidant capable of oxidizing elemental gold, followed by treating the ore with a gold complexing agent and finally leaching the gold from the ore using sulfurous acid as the leaching agent. In a preferred embodiment of the invention, the gold ore is treated with aqueous hydrogen sulfide or salt thereof to form a gold-sulfide complex followed by leaching with an aqueous sulfurous acid to form a soluble gold complex and adsorption by an anion exchange resin.

Gold oxidants which have been found to be suitable in the practice of this invention include chlorine, hypochlorous acid, and hypochlorite salts. Gold complexing agents which have been found suitable in the practice of this invention include thiocyanate salts, thiosulfate salts, and hydrogen sulfide and sulfide salts. When hydrogen sulfide or a sulfide salt is employed as the gold complexing agent, as is the case in the preferred embodiment of the invention, the preceding treatment with the gold oxidant can be omitted.

In the preferred mode of the invention, ground refractory ore feed is slurried with water to produce an ore slurry. The ore feed should be ground to 100%-65 Tyler mesh, and preferably to 100%-100 Tyler mesh, and the solids content of the slurry should be between 35% and 55%, and preferably between 40% and 50% by weight. Hydrogen sulfide is injected into the slurry in the amount of 0.1 to 1.0 pound-moles per ton of ore. The duration of the hydrogen sulfide treatment is preferably between 20 minutes and 2 hours. Aqueous sulfurous acid or gaseous $SO_2$ is then added to the slurry. In a preferred embodiment a chelating agent is added to the slurry before the $SO_2$ addition to sequester any alkaline earth ions present and/or formed in the aqueous phase of the slurry. Sufficient $SO_2$ is added to adjust the slurry pH to a range of about 3.0 to 5.0. The amount of $SO_2$ added to the slurry is preferably about 30 to 100 pounds per ton of ore depending on the composition of the ore. When gaseous or liquid $SO_2$ is used as the source of sulfurous acid, the $SO_2$ is added at a sufficiently fast rate to complete the $SO_2$ addition within about 0.5 to 2.0 hours. In a preferred form of the invention a mild oxidizing agent is added to the slurry simultaneously with the $SO_2$ addition. The mild oxidizing agent, preferably an oxygen-containing gas, such as air or oxygen, is added to prevent gold recovery losses due to the reduction of gold to its elemental state. An anion exchange resin is next added to the ore slurry. The sulfurous acid leaching operation continues as a simultaneous sulfurous acid leaching and resin adsorption operation. The leaching and adsorption operation is preferably carried out in a series of stages in a resin-in-pulp (RIP) circuit, where the ore slurry flows countercurrent to the direction of flow of the resin. The addition of $SO_2$ to the ore slurry is generally continued in one or more stages of the RIP circuit, and is then discontinued but the addition of the oxygen-containing gas continues in the remaining stages. After $SO_2$ addition is discontinued, the pH of the ore slurry tends to rise, via reaction of the natural alkalinity of the ore, to a value of about 6.0 to about 8.0. The anion exchange resin containing the adsorbed gold complex is recovered from the slurry and the gold values are then removed from the resin by chemical stripping.

BRIEF DESCRIPTION OF THE DRAWINGS

A preferred embodiment of the invention is shown in FIG. 1 which is a flowsheet diagram illustrating a preferred mode of operation of the process of this invention.

DETAILED DESCRIPTION OF THE INVENTION

Figure 1:
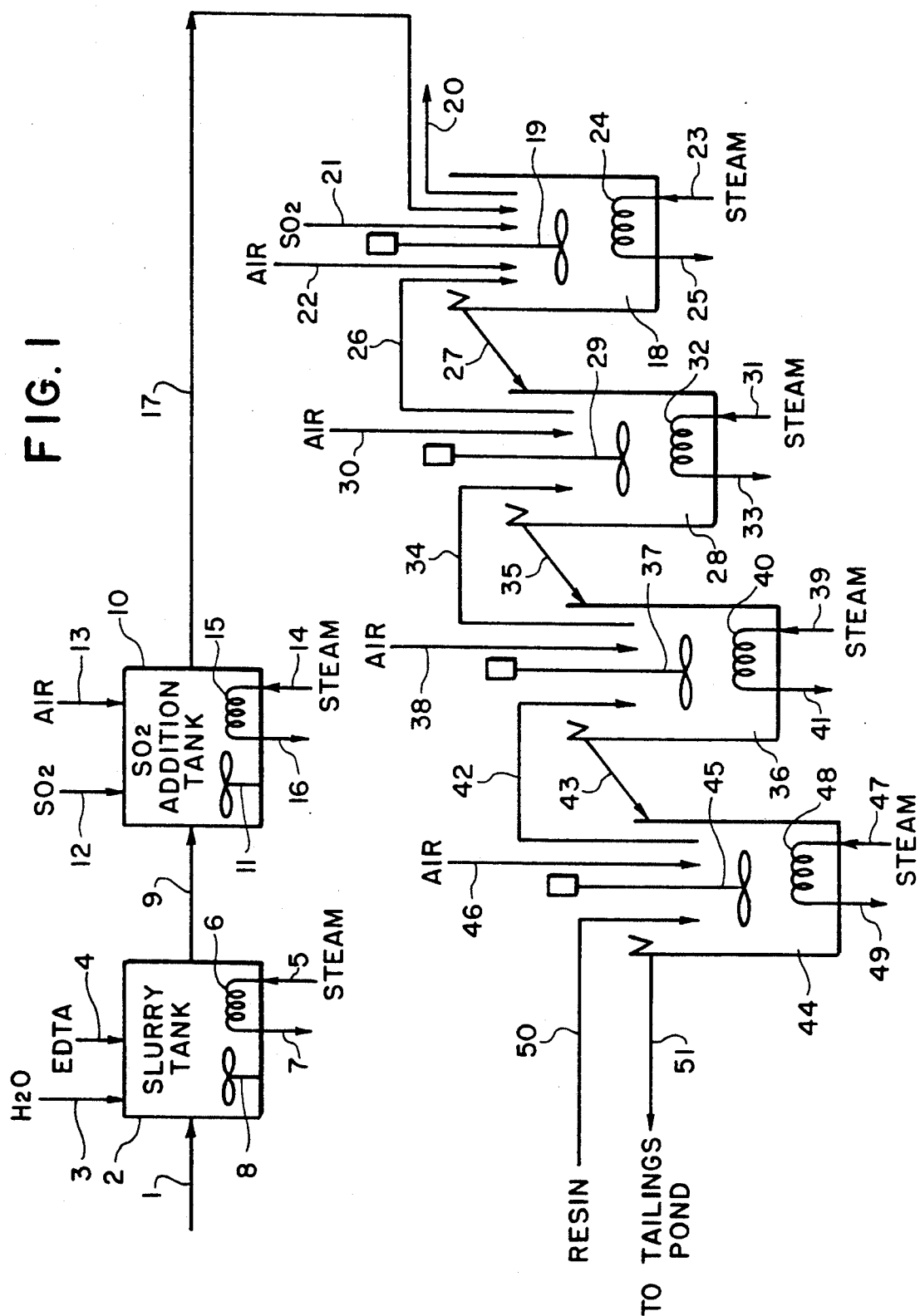
Figure 1:
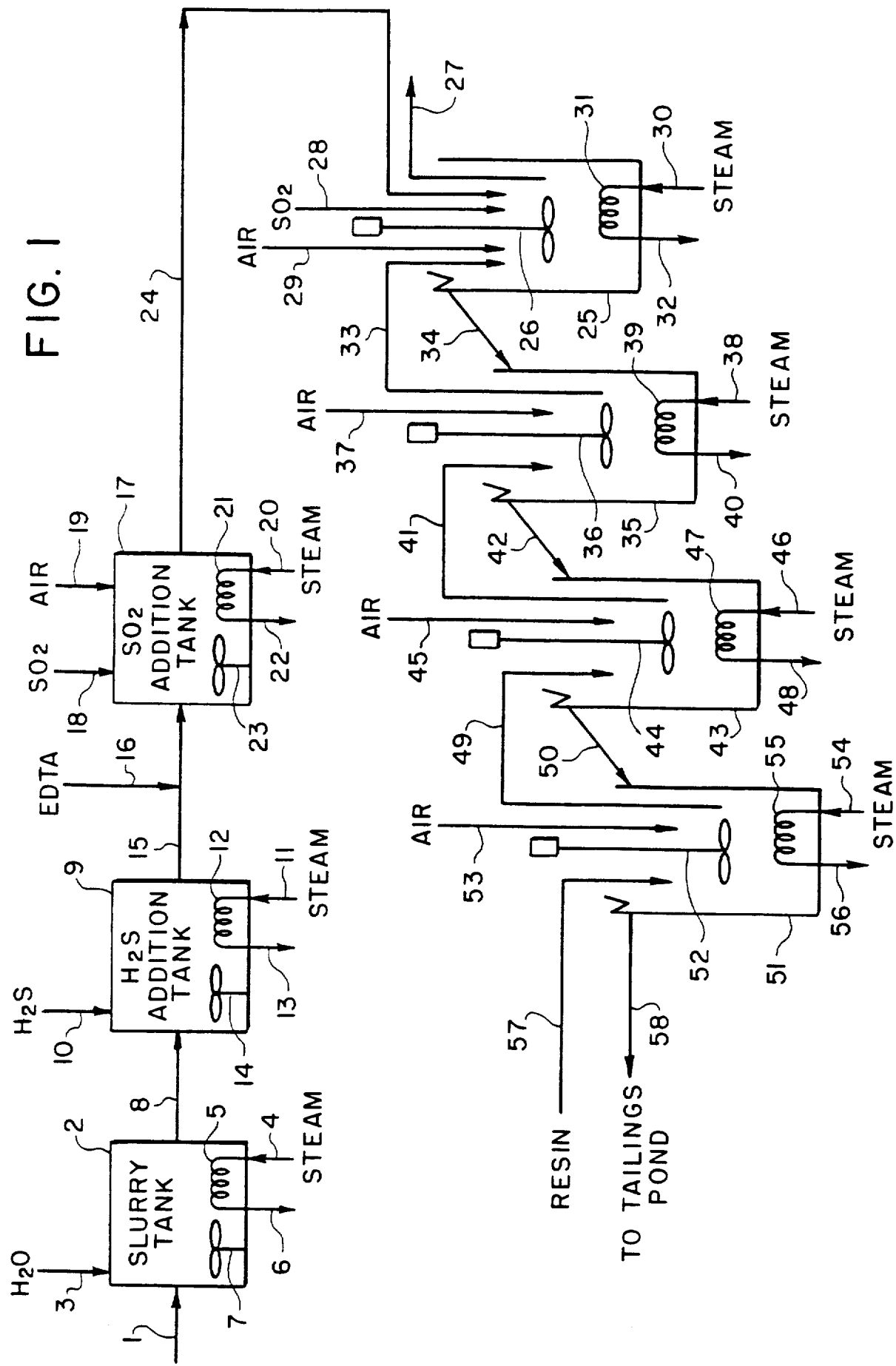

The applicants' commonly assigned, copending U.S. Patent Application entitled Process For Recovery of Gold From Refractory Gold Ores Using Sulfurous Acid As The Leaching Agent discloses a process for recovering gold from refractory gold-bearing ores utilizing a simultaneous dissolved $SO_2$ leaching and anion exchange resin adsorption step in the presence of oxygen. The copending application is directed to certain ores in which the gold is believed to be largely in the aurous (+1) state. The present invention provides a pretreatment which is believed to convert the gold from the elemental (0) state to the aurous state and thereby enables a larger number of gold ores to be amenable to sulfurous acid leaching.

Many of the disadvantages and limitations of the previous gold leaching and recovery processes are obviated by the present invention while providing a process that does not generate toxic wastes. The present invention is directed to a process of recovering gold values from gold-containing ores, particularly refractory gold-containing ores, without the need for a cyanide leaching step. The present invention, specifically, is directed to a process for recovering gold from gold-containing ores using the combination of a gold oxidation and complexing pretreatment, followed by a sulfurous acid leaching step.

Although the exact reactions and mechanisms involved in the process of the present invention are not completely understood, an important part of the process is believed to be based on the respective roles of the oxidant, complexing agent, and sulfurous acid.

In recent years as non-refractory gold ore deposits have become largely depleted, and as the price of gold has increased, more attention in the industry has been directed to gold ores which are refractory because of their content of carbonaceous matter. In many of these carbonaceous ores the gold is believed to be in the aurous state and the applicants have found that this aurous gold is easily solubilized by sulfurous acid. The applicants have further found that while sulfurous acid is effective with gold ores where the contained gold is believed to be in the aurous state, sulfurous acid is often ineffective for gold ores in which all or some of the contained gold is in the elemental state. The present invention is directed to a procedure for converting elemental gold to aurous gold, thereby enabling it to be solubilized by sulfurous acid.

According to the process of the invention, the gold ore is subjected to a gold oxidizing and complexing step to convert a substantial portion of the gold, and particularly the elemental gold, to a form whereby the gold can be effectively leached from the ore using sulfurous acid. After the ore has been pretreated, the ore is leached with sulfurous acid to recover gold values from the ore as a soluble gold-sulfite complex. The gold-sulfite complex is then recovered using an anion exchange resin as discussed in greater detail hereinafter. In one embodiment of the invention the gold ore is first treated with an oxidant capable of oxidizing elemental gold. Gold oxidants which have been found to be suitable in the practice of this invention include chlorine, hypochlorous acid, and hypochlorite salts, such as calcium hypochlorite. The oxidant is employed in amounts equivalent to 5 and 70 lbs of $Cl_2$ per ton of ore, and preferably between 10 and 30 lbs of $Cl_2$ per ton of ore. Treatment of the ore with an oxidant is conducted in the presence of 50 to 3700 lbs of water per ton of ore, and preferably 100 to 500 lbs of water per ton of ore. The ore is treated with the oxidant for a period of time ranging from 10 minutes to 4 hours, and preferably from 20 minutes to 2 hours.

In accordance with the process of this invention, the gold ore is next treated with a gold complexing agent. Gold complexing agents which have been found suitable in the practice of this invention include thiocyanate salts such as potassium thiocyanate, thiosulfate salts such as ammonium thiosulfate, and hydrogen sulfide and sulfide salts such as sodium hydrogen sulfide. The gold complexing agent is employed in amounts equivalent to 0.03 to 3.0 lb-moles per ton of ore and preferably 0.1 to 1.0 lb-moles per ton of ore. Treatment of the ore with a complexing agent is conducted in the presence of 50 to 3700 lbs of water per ton of ore, and preferably 100 to 2400 lbs. of water per ton of ore. The ore is treated with the complexing agent for a period of time ranging from 10 minutes to 4 hours, and preferably from 20 minutes to 2 hours.

The preferred complexing agent used in the process of this invention is hydrogen sulfide or a sulfide salt and particularly water soluble sulfide salts. The principal advantage derived from using hydrogen sulfide or a hydrogen sulfide salt as a gold complexing agent stems from the fact that the need for a prior gold oxidizing step is eliminated. Although the process is not completely understood, it is believed that when hydrogen sulfide or salt thereof is used as the complexing agent, the hydrogen sulfide simultaneously oxides the gold and forms the gold complex thereby eliminating the need for the separate oxidizing step. Thus the preferred embodiment of this invention entails only treating the ore with a hydrogen sulfide oxidizing agent as a sulfiding pretreatment of the ore followed by sulfurous acid leaching of the gold values. The term sulfiding treatment or sulfiding agent as used hereinafter is intended to refer to the combined oxidative and complexing pretreatment of the ore with hydrogen sulfide or salts thereof.

Following the pretreatment step(s) described hereinabove, the ore is finally subjected to sulfurous acid leaching. The use of a sulfiding agent as a pretreatment of a gold ore for subsequent leaching with sulfurous acid represents a new hydrometallurgical approach to the processing of gold ores.

The applicants have found that sulfurous acid is believed to leach only available aurous gold. By subjecting the ore to a sulfiding treatment with hydrogen sulfide or salt thereof or oxidative and complexing treatment prior to sulfurous acid leaching, the finely-divided, available elemental gold (i.e. not encapsulated) is oxidized to a gold complex. The sulfiding treatment or oxidative and complexing treatment prior to leaching increases the extraction capabilities of the $H_2SO_3$—RIP leach system to include available elemental gold in addition to available aurous gold.

Although the sulfiding treatment and oxidative and complexing treatment expands the types of refractory gold ore deposits that can be processed using the $H_2SO_3$—RIP leach system, sulfurous acid is not a universal gold leaching agent. Types of refractory gold ore deposits that do not yield their gold values to the modified system include some pyritic ores with encapsulated gold and ores containing coarse elemental gold particles best recovered by other means.

The sulfiding pretreatment can be performed in various ways. Three such methods found by the inventor to be effective are: 1. blending ground ore with a relatively small quantity of water (100 to 500 lb per ton of ore) containing sodium hydrogen sulfide (0.1 to 1.0 lb-moles/ton of ore), 2. slurrying the ore with water (about 50% solids slurry) containing sodium hydrogen sulfide (0.1 to 1.0 lb-moles/ton of ore), and 3. slurrying the ore with water (about 50% solids slurry) and injecting gaseous hydrogen sulfide (0.1 to 1.0 lb. moles/ton of ore) into the slurry. A heat of reaction is noted, especially for the ore blending in the small quantity of water as in Method 1. The ore blend of Method 1 and ore slurries of Method 2 and Method 3 preferably should not be exposed to air to prevent oxidation of the hydrogen sulfide with resulting gold losses. The sulfiding pretreatment of the ore is preferably conducted in a slurry using hydrogen sulfide as the sulfidation reagent, for example in accordance with Method 3. The pH during the sulfide treatment should be above 4.0 and preferably above 7.0.

The makeup of the gold-sulfide complex is believed to be as follows:

$$(HS-Au-SH)^-$$

When the gold-sulfide complex is formed, it does not report in the liquid phase, but is adsorbed on the ore surface. In the leaching step, excess sulfurous acid is added to react with the gold-sulfide complex. The following equation indicates the type of reactions envisioned:

$$(HS-Au-SH)^- + 2HSO_3^- + 2H^+ \rightarrow (HO_3S-Au-SO_3H)^- + 2H_2S$$
$$2H_2S + H_2SO_3 \rightarrow 3S + 3H_2O$$

Other gold complexes may also form, but are not believed to be necessary to the leaching process. The gold complexes may comprise entities, the structures of which have not yet been defined.

In one preferred embodiment of the invention, the ore is initially crushed and ground and subjected to the oxidative treatment using a gold oxidizing agent in the presence of water. The ore may be mixed with a small amount of water followed by the addition and mixing of the oxidizing agent. After the oxidizing agent has an opportunity to oxidize a substantial portion of the available gold, the ore is slurried with water. The slurry is then subjected to the complexing step by admixing with the complexing agent. Subsequently the slurry is subjected to the sulfurous acid leaching by admixing with sulfurous acid or introducing gaseous or liquid sulfur dioxide to the slurry as discussed hereinafter in greater detail. In a further embodiment of the invention, the crushed and ground ore may be initially slurried in water and subsequently admixed with the gold oxidizing agent. The solids content of the slurry may be adjusted as desired for the subsequent gold complexing and leaching step.

The preferred source of sulfurous acid is gaseous sulfur dioxide bubbled into an aqueous slurry of the pretreated ore using conventional injection and mixing apparatus. Sulfur dioxide is very soluble in water and easily forms sulfurous acid by the reaction:

$$SO_2 + H_2O \rightarrow H_2SO_3$$

The source of sulfurous acid used in the present invention may be any convenient source as well known in art. In a preferred form of the invention, the sulfurous acid is formed in the ore slurry by the addition of sulfur dioxide. The sulfur dioxide is preferably in gaseous form, although liquified sulfur dioxide may also be used. The sulfur dioxide is preferably injected or bubbled through the slurry at a rate sufficient to completely dissolve the sulfur dioxide in the water. It is desirable to complete sulfur dioxide injection into the slurry relatively quickley. Preferably the sulfur dioxide injection is completed within 0.5 to 2 hours. It has been found that if the sulfur dioxide is injected at a slower rate more sulfur dioxide will be required to reach the optimum pH of the slurry. The amount of sulfur dioxide added to the slurry is about 20 pounds to about 150 pounds per ton of ore, and preferably about 30 lbs. to about 100 lbs. per ton of ore. The actual amount of sulfur dioxide added will depend largely on the composition of the ore, since alkaline components of the ore may react with the sulfurous acid. The pH of the slurry during the leaching stage is brought to between about pH 3 and about pH 5 and preferably between pH 4 and pH 5. It has been found that the most efficient gold recovery occurs in this pH range. Preferably the sulfur dioxide or source of sulfurous acid is added at a rate sufficient to maintain the pH in the desired range.

In the preferred form of the invention a mild oxidizing agent is added to the slurry simultaneously with the source of sulfurous acid to obtain optimum gold recovery efficiency. In the preferred embodiment of the invention the oxidizing agent is an oxygen-containing gas, such as air or oxygen, although other oxidizing agents can be used. The oxygen-containing gas, when injected into the ore slurry, dissolves and is believed to prevent the aurous gold from being reduced to its elemental state, thereby keeping the gold in the aurous state where it is most susceptible to sulfurous acid leaching. The probable gold-sulfite complexes formed in the reaction are:

$(HO_3S-Au-SO_3H)^{-1}$ at about pH 3 to 5

$(HO_3S-Au-SO_3)^{-2}$ at about pH 5 to 7

$(O_3S-Au-SO_3)^{-3}$ at about pH > 7

The first gold complex listed, $(HO_3S-Au-SO_3H)^{-1}$, is believed to be formed at the lower pH values of about pH 3 to pH 5. After the sulfurous acid source addition is discontinued, the effect of the natural alkalinity contained in the ore causes the pH of the ore slurry to rise. The rise in the pH promotes the formation of the other two complexes. Although these complexes, because of their higher charges, may adsorb onto a resin more easily than the first complex, the gold complexes formed throughout the entire pH range of operation are adsorbed satisfactorily by anion exchange resins.

A supply of an oxygen-containing gas is desirable for the formation of the gold-sulfite complexes. It should be noted, however, that too much oxygen in the slurry can rapidly oxidize sulfurous acid to sulfuric acid which is not effective in leaching gold values. It is, therefore, necessary to maintain the oxygen and sulfurous acid content in balance. A volumetric ratio of $SO_2$ to air of 1:1 during $SO_2$ injection has been found to be effective in leaching the gold values. The actual oxygen requirement depends on the ore type, but most importantly, the slurry should preferably not be allowed to be depleted of oxygen or other oxidant to maximize gold extraction. Thus, air addition to the slurry is preferably continued throughout the leaching and adsorption process, so as to provide between 10 and 100 lbs. of oxygen per ton of ore.

In preferred embodiments of the invention chelating agents are added to the slurry to sequester calcium, magnesium and other alkaline earth metal ions in the aqueous phase of the slurry. The addition of a chelating agent has been found to improve gold recovery in some ores. It is believed that the chelating agent controls precipitation of insoluble salts and retards blocking of the pores of the ore particles by insoluble salts. Sequestering the metal ions is believed to promote good contact between the gold within the ore particles and the sulfurous acid leaching agent. For example, the use of EDTA as a chelating agent has been found to improve gold recovery in some ores by about 5% to 10% compared to ore slurries without a chelating agent.

Although ethylenediaminetetraacetic acid (EDTA) is a preferred chelating agent, other chelating agents may be effective. Examples of chelating or sequestering agents which may be used include nitrilotriacetic acid, diethylenetriaminepentacetic acid, methanediphosphonic acid, dimethylaminomethane-1,1 diphosphonic acid, aminotrimethylenetriphosphonic acid, sodium hexametaphosphate and 1-hydroxyethane-1,1 diphosphonic acid. The chelating agent is preferably added to the slurry before the addition of sulfurous acid or sulfur dioxide. The chelating agent is added in the amount of about 0.04 to about 2.0 pounds of agent per ton of ore and preferably about 0.8 to about 1.4 pounds of agent per ton of ore. For example, EDTA has been found to be effective when used in the amount of about 1 pound of EDTA per ton of ore.

An anion exchange resin is preferably added to the slurry after the formation of gold-sulfite complexes. Examples of anion exchange resins which may be used include those sold under the tradename Ionac AFP-329 by American Zeolite Corporation, Dowex 1×8, Dowex MSA-1 and Dower 21K by Dow Chemical Co. and Amberlite IRA 400 by Rohm & Haas Co. Other anion exchange resins, which are able to effectively adsorb the gold-sulfite complex, may also be used. Anion exchange resins adsorb the gold-sulfite complex even in the presence of naturally occuring organic carbonaceous matter. Such carbonaceous matter is notorious for the preg-robbing of gold in a cyanide system. Activated carbons, as typically used in many processes, do not effectively adsorb the gold-sulfite complex.

The anion exchange resin is added to the slurry as a granular material in the amount of about 20 pounds to about 100 pounds and preferably about 30 pounds to about 70 pounds per ton of ore. The resin is preferably dispersed in the slurry for a sufficient period of time to effectively adsorb the gold-sulfite complex. The anion exchange resin is then recovered from the slurry and the gold values are recovered by conventional eluting or stripping procedures. For example the resin may be eluted by acidic thiourea.

In a preferred embodiment of the invention an aqueous slurry of crushed and ground refractory, gold-containing ore is introduced into an agitated slurry tank. Hydrogen sulfide gas is next injected into the tank, followed by a sequestering agent, such as EDTA. A source of sulfurous acid and a mild oxidizing agent are then added to the slurry to leach the gold from the ore. Preferably the source of sulfurous acid is gaseous $SO_2$ that is dissolved in the aqueous phase of the slurry to form sulfurous acid. Alternatively the source of sulfurous acid may be liquified $SO_2$ or aqueous sulfurous acid. The mild oxidizing agent is preferably an oxygen-containing gas, such as air or oxygen. The sulfurous acid is allowed to react with the gold values to form soluble sulfite complexes. The slurry is then contacted with an anion exchange resin to adsorb the solubilized gold. The loaded anion exchange resin is then separated from the slurry and eluted to strip the gold-sulfite complex from the resin and to recover the gold.

In the preferred embodiment of the invention, the process is performed continuously in a plurality of tanks or treating vessels arranged in series such that the slurry flows sequentially through the tanks. Referring to FIG. 1, refractory gold-bearing ore, which has been ground to 100% -100 mesh is transferred via line 1 to slurry tank 2 equipped with agitator 7. Sufficient water is added via line 3 to produce a slurry containing about 50% solids by weight. Line 8 is employed to transfer the ore slurry from tank 2 to agitated tank 9. Hydrogen sulfide gas 10 is injected to tank 9 at a rate of 4 to 10 pounds per ton of ore on a dry basis. The temperature of the ore slurry may be controlled by steam 4 entering heat exchanger 5 and exiting through steam condensate outlet 6 and/or steam 11 entering heat exchanger 12 and exiting through steam condensate outlet 13. Reacted contents from tank 9 exit through line 15 to agitate tank 17. A tank for additional sulfide retention time (not shown) can be added directly after tank 9. A chelating agent 16, for example EDTA, is added at a rate of one pound per ton of ore via line 15 before (or, if desired, directly into) tank 17.

The sulfurous acid leaching step begins in agitated $SO_2$ addition tank 17 where $SO_2$ is injected into the ore slurry via line 18 and the $SO_2$ is rapidly dissolved in the aqueous phase of the slurry to form sulfurous acid. Although only one $SO_2$ addition tank is illustrated in FIG. 1, a plurality of such tanks may be used depending on the characteristics of the ore and the amount of $SO_2$ which must be added. Sufficient $SO_2$ is rapidly added to lower the slurry pH to about 5.0 or less. If the ore slurry pH is not reduced below 5.0, the efficient of gold extraction may suffer. The ore slurry pH is preferably maintained above about 3.0, and, most preferably, above about 4.0. The required amount of $SO_2$ is preferably about 30 to 100 pounds per ton of ore although the precise amount required will depend on the alkalinity of the ore. Highly alkaline ores require the addition of more $SO_2$ to achieve the preferred pH range. Ores containing little $SO_2$-consuming material might require addition of alkaline material, such as sodium carbonate or lime, so that the required amount of $SO_2$ can be added without causing the ore slurry pH to fall below 3.0. The bulk of $SO_2$ required in the process is preferably added in $SO_2$ addition tank 17 with a much smaller, maintenance amount added in agitated RIP tank 25. The $SO_2$ is preferably added to $SO_2$ addition tank 17 and agitated RIP tank 25 at a sufficiently fast rate to complete total $SO_2$ addition in 0.5 to 2 hours. Slower $SO_2$ addition times require the use of larger quantities of $SO_2$ to lower the ore slurry pH to below 5.0.

In an alternate mode of the invention, aqueous sulfurous acid may be added to the ore slurry instead of injecting gaseous $SO_2$ into the slurry. Also, liquid $SO_2$ may be used as the $SO_2$ source instead of gaseous $SO_2$. The end result, as far as efficiency of gold recovery, for all these modes of operation should be almost identical.

The mild oxidizing agent, preferably air, is injected via line 19 into the ore slurry contained in $SO_2$ addition tank 17. For optimum results, air should be added in an amount equivalent to between 10 and 100 pounds of oxygen per ton of ore. In the absence of adequate air, gold reduction may occur and less (+1) gold would therefore be available for extraction by the present process. Too much air promotes oxidation of sulfurous acid to sulfuric acid, decreasing the sulfite concentration.

The temperature of the ore slurry in $SO_2$ addition tank 17 is maintained at between about 35° and 140° F. via heat exchanger 21, steam inlet 20 and steam condensate outlet 22. The temperature of the ore slurry should preferably be maintained between 75° and 120° F., and most preferably between 95° F. and 105° F. These temperature conditions are preferably maintained throughout the leaching process.

The ore slurry, containing EDTA, sulfurous acid and air is next transferred via line 24 to the first agitated RIP (Resin-In-Pulp) tank 25. A series of agitated RIP tanks 25, 35, 43, and 51 arranged in a cascade from the first RIP tank 25 to the tailings discharge. The cascade of RIP tanks 25, 35, 43, and 51 comprises the gold sulfite complex adsorption circuit. Although, for ease of illustration, four RIP tanks 25, 35, 43, and 51 are shown in FIG. 1, more or fewer RIP tanks may be used in an industrial plant. In the gold adsorption circuit, the sulfurous acid leaching operation, already begun as described above, is converted to a simultaneous sulfurous acid leaching/gold adsorption operation. Gold adsorption is accomplished by contacting the ore slurry with anion exchange resin, with the resin preferably moving countercurrent to the flow of the slurry. Thus, barren anion exchange resin enters RIP tank 51 via line 57 and is transferred, sequentially, through RIP tanks 51, 43, 35, and 25 via lines 49, 41, 33, and 27, moving in countercurrent flow to the ore slurry which moves, sequentially through RIP tanks 25, 35, 43 and 51 via lines 34, 42, 50, and 58. The rate at which the anion exchange resin is moved through the RIP tanks depends on the gold content of the ore and the desired gold loading of the resin leaving tank 25 through line 27. In an alternative embodiment the anion exchange resin may be introduced into the process in the $SO_2$ addition tank 17. Preferably, however, the resin addition step is delayed until the bulk of the $SO_2$ has been added.

In RIP tank 25, additional $SO_2$ is added if needed via line 28 to maintain the desired pH level and promote efficient formation of the gold-sulfite complex. At this point in the process, however, $SO_2$ addition is generally not necessary when processing many ores. Once $SO_2$ addition is discontinued, ore slurry pH will rise due to the natural alkalinity contained in the ore. The pH of a typical ore slurry will rise to between 6.0 and 8.0 by the time the ore slurry exits RIP tank 51 via line 58. The rise in ore slurry pH, while not essential for the invention, may be beneficial for operational purposes since gold complexes produced at the higher pH's have a higher charge and should tend to adsorb onto the resin at a faster rate than gold complexes formed at the lower pH range.

Air is added to RIP tank 25 via line 29. The resin entering RIP tank 25 via line 33 has previously passed, sequentially, through the other RIP tanks 51, 43, and 35, and is partially loaded with gold-sulfite complex. The mixture of resin and ore slurry (also containing EDTA, sulfurous acid and air) contained in RIP tank 25 is agitated via agitator 26 for a period of time long enough to provide intimate contact between all phases. As a result, additional gold-sulfite complex is adsorbed onto the resin in RIP tank 25. The gold-loaded resin is then transferred from RIP tank 25 by line 27. The expected gold loading on the resin exiting RIP tank 25 is at least about 20 ounces per ton of the anion exchange resin, depending on the particular resin used in the extraction and the gold content of the ore.

The gold-loaded resin is forwarded to desorption vessels (not shown) where the gold-sulfite complex is chemically stripped from the exchange resin. Acidic thiourea is one chemical that has been found to be effective for use in stripping the gold-sulfite complex from the resin. The acidic thiourea stripping solution consisted of 10 grams per liter of thiourea and 25 gpl of hydrochloric acid. The temperature of the stripping solution was about 120° F. Other conventional stripping methods and solutions may be used. The regenerated resin would normally be reused in the process.

The partially gold-depleted ore slurry exits RIP tank 25 via line 34 and, as previously described, passes sequentially through RIP tanks 35, 43 and 51. In each RIP tank, the ore slurry and resin are agitated to provide intimate contact between the ore slurry and resin and to promote additional gold-sulfite complex adsorbing onto the resin. Thus, in each successive RIP tank, the ore slurry is further depleted of its gold values.

The gold-depleted ore slurry exits the last RIP tank 51 in the cascade of RIP tanks 25, 35, 43 and 51 via line 58. The depleted ore slurry is transferred to a tailings pond.

The total time required for the sulfurous acid leaching operation (inclusive from the time the $SO_2$ is first injected into the ore slurry until the time the ore slurry is transferred from the last RIP tank 51) is generally about 5–30 hours and preferably about 16–20 hours, depending on ore characteristics and on operational constraints.

The nominal retention time of the ore slurry in the RIP circuit is generally about 3 to 29 hours, and preferably 10 to 19 hours.

In each of the RIP tanks 25, 35, 43 and 51, a conventional means of separating the resin from the ore slurry as known in the art may be provided to effect overall countercurrent flow between the resin and ore slurry. Screening is the most common method employed in the mineral processing industry and is generally preferred.

The anion exchange resin used to adsorb the gold-sulfite complex in the present invention can be either a strong base or weak base resin. A relatively coarse resin is preferably used to facilitate the screening operation referred to above, although the particle size will be dependent on the ore and the separation equipment used.

The above-described process is particularly effective on gold ores wherein the refractory nature of the gold ores is caused by their content of carbonaceous and sulfidic material. The described preferred mode of the invention is continuous in operation. The process can also be operated batchwise as one skilled in the industry would easily recognize. The advantages and disadvantages of continuous and batch processes are known throughout industry.

Although the described preferred mode is a milling process, other milling and non-milling gold extraction applications exist for the process. For example, gold extraction operations employing heap and vat leaching, could make effective use of gold oxidative and complexing treatment sulfurous acid as the leaching agent. Milling operations using precipitation methods rather than the described resin-in-pulp method might also be able to use the present invention. It should also be noted that the invented process, although directed herein to gold-containing ores, can also be used to extract gold from ore concentrates and mill waste materials, such as ore tailings. Other uses and modifications of the process are readily recognized by one skilled in the industry.

The essence of the present invention is the use of a pretreatment of the ore to improve the ability of sulfurous acid to function as the leaching agent for gold associated with ores, notably refractory ores. The features of the invention, namely use of chelating agents, an oxygen-bearing gas, and anion exchange resin, are all intended to promote the efficiency of the sulfurous acid leaching element. The normal and preferred ranges employed in operating the process of this invention are summarized below:

| GOLD LEACHING PROCESS NORMAL AND PREFERRED RANGES | | | |
|---|---|---|---|
| | Normal Range | Preferred Range | Most Preferred Range |
| Ore Grind | 100%-65 Tyler Mesh | 100°-100 Tyler Mesh | — |
| Amount of Hypochlorite Used[1] | Equivalent to 5 to 70 lbs $Cl_2$ per ton of ore | Equivalent to 10 to 30 lbs. $Cl_2$ per ton of ore | |
| Amount of Water Used During Hypochlorite Treatment | 50 to 3700 lbs/ton of ore | About 100 to 500 lbs/ton ore | |
| Duration of Hypochlorite Treatment[1] | 10 min. to 4 hrs. | 20 min. to 2 hours | |
| Amount of Complexing Agent Used[2] | 0.03 to 3.0 | 0.1 to 1.0 | |
| Amount of Water Used During Complexing Treatment | 50 to 3700 lbs/ton or ore | 1300 to 2400 lbs/ton or ore | |
| Duration of Complexing Treatment | 10 min to 4 hrs. | 20 min. to 2 hrs | |
| Solids Content of Slurry During Leaching | 35% to 55% by weight | 40% to 50% by weight | |
| Slurry Temperature | 35° F. to 140° F. | 75° F. to 120° F. | 95° 105° F. |
| Amount of Chelating Agent Used[3] | 0.04 to 2 | 0.8 to 1.4 | — |
| Amount of $SO_2$ Used[4] | 20 to 150 | 30 to 100 | — |
| $SO_2$ Addition Time | 0.5 to 2.0 hours | — | — |
| pH During $SO_2$ Addition | 3.0 to 5.0 | 4.0 to 5.0 | — |
| Amount of Air | Equivalent to | — | — |

GOLD LEACHING PROCESS
NORMAL AND PREFERRED RANGES

|  | Normal Range | Preferred Range | Most Preferred Range |
|---|---|---|---|
| Used[5] | 10 to 100 | | |
| Duration of Air Injection[6] | 5 to 30 hours | 16 to 20 hours | — |
| Amount of Anion Exchange Resin in Ore Slurry[7] | 20 to 100 | 30 to 70 | — |
| Retention Time of Ore in RIP Circuit | 3 to 29 hours | 10 to 19 hours | — |

[1] Hypochlorite usage is optional and generally not necessary when hydrogen sulfide or a hydrogen sulfide salt is used as the complexing agent.
[2] lb-moles per ton of ore
[3] lb. of agent per ton of ore
[4] lbs. of $SO_2$ per ton of ore
[5] lbs. of oxygen per ton of ore
[6] throughout entire leaching-RIP circuit
[7] lbs. of resin per ton of ore In summary, the process as described herein offers a new process which includes a pretreatment of gold ores to prepare their gold content for extraction with sulfurous acid as a leaching agent. The new process may be also applied to ore concentrates, ore tailings, and other gold containing materials. Because of the disclosures herein, one skilled in the industry can employ other techniques to achieve the same desired results obtained with sulfide, i.e. converting the elemental gold to a form that is leachable by sulfurous acid.

The new pretreatment followed by the leaching step with sulfurous acid will not work on all ores but is very effective on many ores. Sulfurous acid alone appears most effective as a leaching agent when uses on ores wherein the contained gold is believed to be in the aurous state. With the pretreatment, the sulfurous acid leaching process is extended to include ores containing finely-divided gold in the elemental state. However, as is generally the case in extractive metallurgy, it is difficult to predict the response of a given gold ore to the process of this invention based on the characteristics of the ore. An effective exploratory method of establishing the response of a given gold ore to the process of this invention is through small scale tests, as described in Examples 1 through 10 hereinbelow.

An important advantage of the invented process is in its positive effects on the environment. The process can replace cyanide as the leaching agent for some gold ores. At the end of the leaching operation, the ore slurry stream has a near neutral pH. The effluent ore slurry stream contains a small amount of sulfite ions which are readily oxidizable and do not pose a serious environmental hazard.

EXAMPLES

The ore samples used in the following examples were obtained from Jerritt Canyon and Big Springs located near Elko, Nevada. Although all the ores used in these examples are considered refractory, the reason for their individual refractoriness is often not completely understood. The major ore constituents are identified below. However, the degree of refractoriness cannot be determined with certainty from a review of the constituents, although such a review offers clues that are helpful. Because of their refractory nature, all of the ores listed below require some form of pretreatment, such as for example, oxidation via chlorination or oxidative roasting, before being subjected to standard cyanidation processes. All of the ore samples were ground to 100% -100 Tyler mesh unless otherwise specified. A controlled grind was performed using screening at 100 mesh and regrinding only the +100 mesh material to minimize production of fines. All percentages are by weight unless otherwise specified.

FEED A: A Jerritt Canyon carbonaceous ore (Roberts Mountain formation siltstone). Principal components: Au 0.289 oz/ton, 1.16% organic carbon, 1.25% total sulfur, 1.07% sulfide sulfur, 29% $CO_3$, 10.6% Ca, 5.5% Mg, 1.6% Fe, 37.9% $SiO_2$.

FEED B: A Jerritt Canyon carbonaceous ore (a 3:1 ore blend of Roberts Mountain formation siltstone and Hanson Creek formation limestone). Principal components: Au 0.188 oz/ton, 0.96% organic carbon, 1.0% total sulfur, 0.91% sulfide sulfur, 30.6% $CO_3$, 11.7% Ca, 3.5% Mg.

FEED C: A Jerritt Canyon (Upper North Generator Hill location--Hanson Creek formation limestone) ore. Principal components: Au 0.230 oz/ton, 0.40% organic carbon, 0.82% total sulfur, 0.74% sulfide sulfur, 36% $CO_3$, 16% Ca, 3.6% Mg.

FEED D: A Jerritt Canyon (Marlboro Canyon location-Hanson Creek formation limestone) ore. Principal components: Au 0.228 oz/ton, 0.32% organic carbon, 0.90% total sulfur, 0.85% sulfide sulfur, 37.5% $CO_3$, 21% Ca, 2.2% Mg.

FEED E: A Big Springs ore, mostly oxide with some carbonaceous ore. Principal components: Au 0.226 oz/ton, 0.15% organic carbon, 0.12% total sulfur, 0.08% sulfide sulfur, 0.7% $CO_3$, 2.5% Fe.

FEED F: A Jerritt Canyon (Upper North Generator Hill location-blend of mostly Hanson Creek formation limestone with some Roberts Mountain formation siltstone) ore. Principal components: Au 0.200 oz/ton, 0.31% organic carbon, 0.95% total sulfur, 0.18% sulfide sulfur, 7.2% $CO_3$, 2.0% Ca, 1.1% Mg.

FEED G: A Jerritt Canyon (West Generator Hill location-Roberts Mountain formation siltstone) ore. Principal components: Au 0.165 oz/ton, 1.05% organic carbon, 1.25% total sulfur, 1.08% sulfide sulfur, 21% $CO_3$, 6.8% Ca, 3.4% Mg.

FEED H: A Jerritt Canyon (Marlboro Canyon location-Roberts Mountain formation siltstone, Hanson Creek formation jasperoid and Hanson Creek formation limestone) ore. Principal components: Au 0.254 oz/ton, 0.31% organic carbon, 0.70% S, 0.65% sulfide sulfur, 22.5% $CO_3$, 13.6% Ca, 1.5% Mg.

FEED I: A Jerritt Canyon (Upper North Generator Hill location-Roberts Mountain formation siltstone) ore. Principal components: Au 0.167 oz/ton, 0.75% organic carbon, 1.38% S, 1.26% sulfide sulfur, 24.7% $CO_3$, 10.2% Ca, 4.8% Mg.

FEED J: A Jerritt Canyon (Marlboro Canyon location-Hanson Creek formation jasperoid) ore. Principal components: Au 0.099 oz/ton, 1.03% organic carbon, 0.16% S, 0.14% sulfide sulfur, 0.7% $CO_3$, 1.3% Ca, 0.04% Mg.

Feeds A and B are examples of carbonaceous ores believed to contain most of the gold in the aurous state. Feeds C and D are believed to contain substantial aurous gold with some elemental gold. Feeds E and F are believed to contain some aurous gold but more elemental gold. Feed G is believed to contain some aurous gold, but may also have sulfide-encapsulated gold.

Feeds H, I, and J, like Feeds C and D, appear to contain both aurous and elemental gold.

EXAMPLES 1 THROUGH 10

A series of gold extraction tests was performed on samples of the gold ore Feeds A through J listed hereinabove. With the exception of Examples 1 and 2, the results of these tests, summarized in Table 1, provide a comparison of the extraction efficiencies obtained using the process of this invention (a sulfiding pretreatment, followed by sulfurous acid leaching) with those using the conventional cyanidation/carbon-in-leach (CN/CIL) method and those using the sulfurous leaching process disclosed in the copending application.

TABLE 1

Comparison of Gold Extraction Efficiencies Obtained By Conventional CN/CIL, $H_2SO_3$/RIP, and Sulfiding/$H_2SO_3$/RIP

| | | % Gold Extraction | | |
|---|---|---|---|---|
| Example | Ore | CN/CIL | $H_2SO_3$/RIP | $S^=$/$H_2SO_3$/RIP |
| 1 | A | 0 | 84 | — |
| 2 | B | 0 | 84 | — |
| 3 | C | 31 | 62 | 76 |
| 4 | D | 15 | 58 | 78 |
| 5 | E | 65 | 23 | 63 |
| 6 | F | 59 | 23 | 78 |
| 7 | G | 4 | 35 | 21 |
| 8 | H | 23 | 46 | 69 |
| 9 | I | 14 | 41 | 74 |
| 10 | J | 20 | 57 | 82 |

Examples 1 and 2 were conducted using gold ore Feeds A and B, respectively, which do not respond to the conventional CN/CIL method, but exhibit excellent response (84% gold extraction) to the leaching process utilizing sulfurous acid as the leaching agent. These two ores, therefore, do not require the gold oxidation and complexing pretreatment disclosed in the present application.

Examples 3, 4, 8, 9, and 10 were conducted using ore Feeds C, D, H, I, and J, respectively, all of which responded better to the sulfurous acid leaching process than to conventional CN/CIL treatment, and yet benefitted significantly from the sulfiding pretreatment of the present invention. For example, ore J, which yielded only 20% of its gold content to conventional CN/CIL treatment and 57% to the sulfurous acid leaching process, responded to the process of this invention by yielding 82% of its gold.

Examples 5 and 6 were performed using gold ore Feeds E and F, respectively, in which a significant fraction of the gold content is believed to be in the elemental state, as evidenced by the relatively good response of these ores to the conventional cyanidation/CIL method. While the response of these two ores to the sulfurous acid leaching process is relatively poor (only 23% gold extraction), pretreatment of these ores with sodium hydrogen sulfide in accordance with the present invention renders these ores much more amenable to subsequent leaching with sulfurous acid.

Example 7 was performed on ore G which is believed to contain encapsulated gold and which therefore does not yield high gold recoveries to any of the leaching methods tested.

EXPERIMENTAL PROCEDURES FOR EXAMPLES 1 to 10

Cyanidation-CIL

In each of these examples, a 200 g sample of −100 Tyler mesh ore Feeds A through J, respectively, was blended with 245 ml of water in a 800 ml fleaker to form a 45% solids slurry. The pH of the slurry in each fleaker was adjusted to 10.5 using lime. Sodium cyanide (0.245 g) and coarse (+16 Tyler mesh) activated carbon (5 g) were added to each fleaker. The fleakers were then subjected to a rolling test (30RPM) for 20 hours. The tests were stopped and the carbon was screened away from the slurries. The slurries were filtered to separate the filtrates from the ore tails. Percent gold extraction, shown in Table 1, is based on feed and tails assays.

$H_2SO_3$/RIP

In each example (1 through 10), a 200 gram sample of ore Feed A through J, respectively, was blended with 245 grams of an aqueous solution preheated to 100° F. and containing dissolved $SO_2$ (40 lbs/ton of ore) and EDTA (1 lb/ton of ore). Dowex 21K resin (50 lb/ton of ore) was added and air was injected at about 20 ml/min. After a total leaching period of 20 hours, the tests were stopped and the resin was screened away from the slurries. The slurries were filtered to separate the filtrate from the leached ore tails. Percent gold extraction, shown in Table 1, is based on feed and tails assays.

Sulfiding-$H_2SO_3$/RIP

In each example (3 through 10), a 200 gram sample of ore Feeds C through J, respectively, was blended with water (300 lbs/ton of ore) containing sodium hydrogen sulfide. The amount of NaSH employed was equivalent to 7 lbs/ton of ore in Examples 3, 6, 8, 9, and 10; in Example 5, the amount of NaSH employed was equivalent to 14 lbs/ton of ore, and in Examples 4 and 7 the amount of NaHS employed was equivalent to 21 lbs/ton of ore. In four of the tests sodium carbonate was added. The amount of sodium carbonate used was 20 lbs/ton of ore in Examples 4 and 8, and 50 lbs/ton of ore in Examples 9 and 10.

These ore blends were allowed to react for 30 minutes. (Heat is generated in this reaction). Next, the ore blends were slurried into sulfurous acid/EDTA solutions to yield 45% solids slurries at 100° F., said solutions containing the equivalent of 40 lbs $SO_2$/ton of ore and 1 lb EDTA/ton of ore. Dowex 21K resin (50 lb/ton-ore) was added and air was injected at 20 ml/min. After a 20 hour leaching period, the resin was screened away from the slurries. The slurries were filtered to separate the filtrate from the tails. Percent gold extraction, shown in Table 1, is based on ore feed and tails assays.

EXAMPLES 11 THROUGH 15

Feed E was employed in these five examples. This feed ore is believed to contain both aurous and elemental gold and these examples serve to illustrate the effectiveness of a pretreatment comprising an oxidation step (using a hypochlorite) followed by gold complexation step (using a thiocyanate, thiosulfate, or sulfide) in rendering the gold ore more amenable to extraction with sulfurous acid. The results obtained in Examples 11 through 15 are summarized in Table 2.

TABLE 2

Comparison of Oxidizing - Complexing - Leaching Processes in Efficiency of Gold Extraction

| Example | Calcium Hypochlorite* | Complexing Agent (lbs/ton or ore) | % Gold Extraction |
|---|---|---|---|
| 11 | None | None | 23 |
| 12 | 5 | KCNS (10) | 46 |
| 13 | 15 | KCNS (10) | 65 |
| 14 | 5 | $(NH_4)_2S_2O_3$ (20) | 46 |

TABLE 2-continued

Comparison of Oxidizing - Complexing - Leaching Processes in Efficiency of Gold Extraction

| Example | Calcium Hypochlorite* | Complexing Agent (lbs/ton or ore) | % Gold Extraction |
|---|---|---|---|
| 15 | 15 | NaHS (21) | 63 |

*Pounds of equivalent $Cl_2$ per ton of ore.

As evident from Example 11, without pretreatment ore Feed E yields a gold extraction of only 23%. Various combinations of a two-step pretreatment using a calcium hypochlorite followed by a gold complexing agent, such a potassium thiocyanate, ammonium thiosulfate, or sodium hydrogen sulfide, increased the gold extraction efficiencies attained in the subsequent sulfurous acid leaching step to the range of 46 to 65%. A comparison of gold extraction efficiencies obtained in Examples 5 and 15 suggests that when NaHS is used as the sulfiding or complexing agent, the preoxidation of the ore using calcium hypochlorite is not needed since the gold recoveries using the sodium hydrogen sulfide sulfiding step were substantially the same as the calcium hypochlite and NaHS process. The NaHS appears to oxidize and complex the gold simultaneously.

EXPERIMENTAL PROCEDURES FOR EXAMPLES 11 THROUGH 15

In examples 12 through 15, 200 g samples of dry ore feed E ground to −100 Tyler mesh were blended with 20 mls of water containing the amount of calcium hypochlorite specified in Table 2. The blends were allowed to react for about 30 minutes, after which time 10 mls of water containing the complexing agent specified in Table 2 were blended into the ore samples. After an additional 30 minute retention time, the ore blends were ready for the $H_2SO_3$/RIP gold leach. In Example 11 the preoxidation/complexation steps described above were omitted.

The $H_2SO_3$/RIP gold leaching step for Examples 11 through 15 entailed slurrying the respective ore samples, pretreated in Examples 12 through 15 as described above, in sulfurous acid solutions preheated to 100° F. and containing dissolved EDTA. The sulfurous acid solutions contained the equivalent of 40 lb $SO_2$ per ton of ore and 1 lb EDTA per ton or ore. The slurries contained 45% ore solids. Dowex 21K resin was added to each slurried sample in an amount equivalent the 50 lbs per ton of ore and air was injected into each of the slurries at a rate of 20 ml/min over a 20 hour leaching period, after which time the resin was separated from the slurries by screening. The slurries were filtered to separate the filtrates from the leached ore tails. Percent gold extraction shown in Table 2 is based on feed and tails assays.

EXAMPLES 16 AND 17

These two tests were performed using ore Feed E slurried at about 45% solids for both the sulfide treatment as well as the $H_2SO_3$ RIP leaching. In Example 16 NaHS was used as the sulfiding agent, while in Example 17 gaseous $H_2S$ was injected into the slurry. Injection of gaseous $SO_2$ provided the sulfurous acid for the leaching step in both of these examples. As evident from the data presented in Table 3, the gold extractions attained in these two examples were 62% and 64%, respectively, and are comparable to the gold recovery obtained in Examples 5 (63%) in which the sulfiding step was conducted in an ore blend containing considerably less water (300 lbs/ton of ore).

TABLE 3

| | Gold Extraction Efficiencies Following Sulfiding at 45% Solids | |
|---|---|---|
| Example No. | Sulfiding Agent (Quantity) | % Gold Extraction |
| 16 | NaHS (17.5 lb/ton of ore) | 62 |
| 17 | $H_2S$ (9.3 lb/ton of ore) | 64 |

EXPERIMENTAL PROCEDURES FOR EXAMPLES 16 AND 17

In Example 16, 300 grams of ore Feed E was slurried in 366 ml of deoxygenated (nitrogen-purged) water containing dissolved NaHS in an amount equivalent to 17.5 lbs per ton of ore, and the sulfiding treatment was allowed to proceed for a period of 30 minutes under a nitrogen atmosphere. In Example 17, another sample of the same ore feed was slurried in 366 ml of deoxygenated water. Gaseous $H_2S$ was injected into the slurry at about 30 ml/min for 20 minutes providing the equivalent of about 9.3 lbs $H_2S$ per ton of ore. Following these sulfiding pretreatments, both slurries were subjected to EDTA addition (1 lb/ton of ore), $SO_2$ injection (about 40 lbs/ton of ore injected over a period of about 50 minutes) and aeration (20 ml/min over a period of 20 hours). In both examples, Dowex 21K anion exchange resin (50 lbs/ton of ore) was added to the slurries immediately following the $SO_2$ injection. After the 20 hour leaching period the resin was separated from the slurries by screening and the slurries were filtered to separate the filtrates from the ore slurries. Percent gold extraction shown in Table 3 is based on feed and tails assays.

Alternately, the sulfiding treatment can be applied to the slurry subsequent to the introduction of sulfurous acid, but the enhancement in gold recoveries is not as pronounced as illustrated by these examples.

While Examples 1 through 17 provided above represent tests conducted in the batch mode, the process of this invention can also be practiced in a continuous mode.

Numerous other tests were conducted to study the effect of operating parameters (temperatures, duration of the respective process steps, selection of reagents, quantity of reagents, reagent concentrations, etc.) on the efficiency of gold extraction from various gold ores. The information derived from those tests provided the basis defining for the normal and preferred ranges of the process disclosed hereinabove.

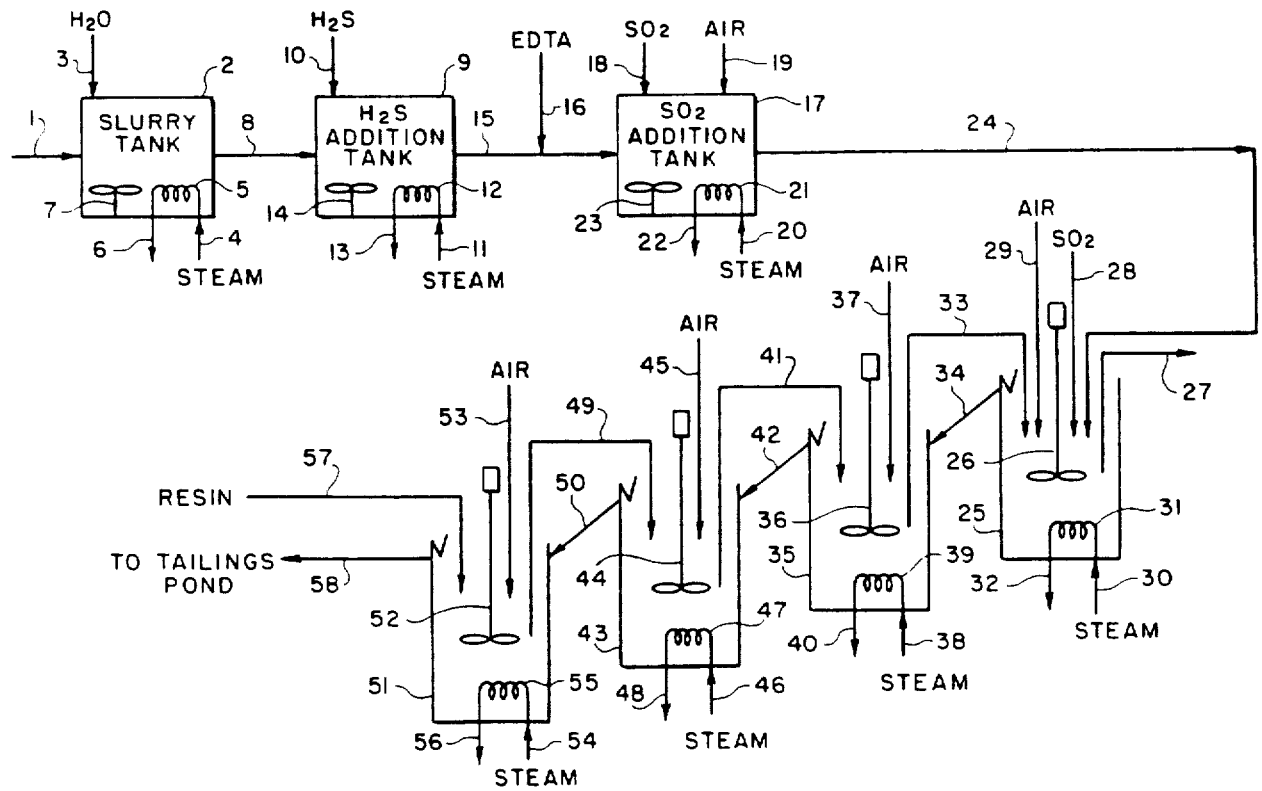

We claim:

1. A process for leaching gold values from gold-containing ores comprising treating the ore with a gold oxidizing and complexing agent to form a gold complex and leaching said ore with sulfurous acid leaching agent to form a gold sulfite complex.

2. The process of claim 1 comprising treating the ore with the gold oxidizing and complexing agent in an aqueous slurry at a pH above 4, wherein said gold oxidizing and complexing agent is selected from the group consisting of hydrogen sulfide and salts thereof.

3. The process of claim 1 comprising treating said ore with a gold-oxidizing and complexing agent capable of oxidizing elemental gold and forming a gold complex which is amenable to sulfurous acid leaching.

4. The process of claim 1 further comprising contacting said gold sulfite complex with an anion exchange resin to adsorb said gold sulfite complex and recovering gold values from said anion exchange resin.

5. The process of claim 1 comprising leaching said treated ore with a sulfurous acid leaching agent having pH of about 3 to about 5.

6. A process for leaching gold values from gold-containing ores comprising treating the ore with a gold oxidant to oxidize metallic gold, treating said ore with a gold complexing agent and leaching said ore with a sulfurous acid leaching agent to form a gold-sulfite complex.

7. The process according to claim 6 wherein the gold oxidant is selected from the group consisting of chlorine, hypochlorous acid, and hypochlorite salts.

8. The process according to claim 6 wherein the gold complexing agent is selected from the group consisting of thiocyanate salts, thiosulfate salts, hydrogen sulfide, and sulfide salts.

9. The process of claim 6 comprising adding at least one mild oxidizing agent to the sulfurous acid leaching agent during said leaching.

10. The process of claim 6 wherein the sulfurous acid leaching agent includes at least one chelating agent.

11. The process of claim 6 wherein said leaching takes place in a slurry of ground, treated gold-containing ore suspended in the sulfurous acid leaching agent, wherein said slurry has a pH of about 3 to about 5.

12. The process of claim 11 comprising admixing an ion exchange resin with the slurry for an effective time to adsorb said gold-sulfite complex and separating said resin from the slurry.

13. The process of claim 12 comprising recovering gold values from said resin following the separation of said resin from the slurry.

14. The process of claim 12 wherein said ion exchange resin is an anion exchange resin.

15. The process of claim 11 wherein said slurry is formed by introducing sulfur dioxide into an aqueous slurry of gold-containing ore to form sulfurous acid in an aqueous phase of the slurry.

16. The process of claim 15 comprising adding said sulfur dioxide as a gas.

17. A process for leaching gold values from gold-containing ores comprising treating said ore with a gold-oxidizing and complexing compound selected from the group comprising hydrogen sulfide and sulfide salts to form a gold-sulfide complex, and leaching said ore with sulfurous acid leaching agent to form a gold-sulfite complex.

18. The process of claim 17 comprising adding at least one mild oxidizing agent to the sulfurous acid leaching agent during said leaching step.

19. The process of claim 17 wherein the ore is in the form of an aqueous slurry, and wherein said slurry has a pH above 4 while treating with said gold-oxidizing and complexing compound.

20. The method of claim 17 comprising adding at least one chelating agent to the sulfurous acid leaching agent.

21. The method of claim 17 wherein said leaching takes place in a slurry of ground treated gold-containing ore suspended in the sulfurous acid leaching agent.

22. The method of claim 21 comprising separating said gold-sulfite complex from the slurry by admixing an ion exchange resin with the slurry for an effective time to adsorb said gold-sulfite complex and separating said resin from the slurry.

23. The method of claim 22 comprising recovering gold values from said resin following the separation of said resin from the slurry.

24. The method of claim 22 wherein said ion exchange resin is an anion exchange resin.

25. The method of claim 21 wherein said slurry is formed by introducing sulfur dioxide into an aqueous slurry of gold-containing ore to form sulfurous acid in an aqueous phase of the slurry.

26. The method of claim 25 comprising adding said sulfur dioxide as a gas.

27. A process for recovering gold values from gold-containing ores comprising the steps of:
  a. grinding said ore;
  b. blending the ground ore with a gold oxidant in the presence of water;
  c. allowing the ore blend from step (b) to react;
  d. adding a gold-complexing agent to said ore blend;
  e. allowing the ore blend from step (d) to react;
  f. mixing the ore blend from step (e) with water to form an ore slurry;
  g. adding a chelating agent to the ore slurry from step (f)
  h. injecting $SO_2$ into the ore slurry to form sulfurous acid;
  i. adding an oxygen-containing gas to said slurry and leaching gold values from the ore by intimately contacting the ore with sulfurous acid in the presence of said oxygen-containing gas for sufficient time to leach the gold from the ore thereby producing a gold-sulfite complex and contacting said gold-sulfite complex with an anion exchange resin and adsorbing said gold-sulfite complex onto said anion exchange resin; and
  j. recovering said gold-sulfite complex from said anion exchange resin.

28. The process of claim 27 wherein said ground ore is about −100 Tyler mesh.

29. The process according to claim 27 wherein the gold oxidant is selected from the group comprising chlorine, hypochlorous acid, and hypochlorite salts, and is used in an amount equivalent to 10 to 30 lbs $Cl_2$ per ton of ore.

30. The process of claim 27 wherein said slurry contains about 50% by weight solids.

31. The process according to claim 27 wherein the gold complexing agent is selected from the group consisting of thiocyanate salts, thiosulfate salts, hydrogen sulfide, and hydrogen sulfide salts and is used in an amount equivalent to 0.1 to 1.0 lb-moles per ton of ore.

32. The process of claim 27 wherein the source of said sulfurous acid is gaseous $SO_2$ introduced to said slurry to form sulfurous acid.

33. The process of claim 27 comprising introducing $SO_2$ to the slurry in the amount of about 30 to about 100 pounds per ton of ore.

34. The process of claim 27 wherein said oxygen-containing gas is air introduced to the slurry in the amount equivalent to provide about 10 lbs. to 100 lbs. of oxygen per ton of ore.

35. A process for recovering gold values from gold-containing ores comprising the steps of:
  a. grinding said ore to about −100 mesh;
  b. mixing the ground ore with water to produce a slurry containing about 40% to 50% by weight solids;
  c. adding hydrogen sulfide or a hydrogen sulfide salt to the ore slurry;

d. allowing the slurry from step (C) to react for 20 minutes to 2 hours;
e. adding a chelating agent to the ore slurry;
f. heating the ore slurry to a temperature between 75° F. and 120° F.;
g. injecting $SO_2$ in the amount of about 30 to 100 pounds per ton of ore into the ore slurry to form sulfurous acid;
h. leaching the resulting ore slurry with an aqueous sulfurous acid leaching agent in the presence of an oxygen-containing gas for sufficient time to leach the gold from said ore whereby a gold-sulfite complex is produced and adsorbing said gold-sulfite complex with an anion exchange resin; and
i. recovering said gold-sulfite complex from said anion exchange resin.

36. The process according to claim 35 wherein the hydrogen sulfide or hydrogen sulfide salt is added in an amount equivalent to 0.1 to 1.0 lb-moles of $H_2S$ per ton-ore.

37. The process of claim 35 wherein the chelating agent is selected from the group consisting of EDTA, nitilotriacetic acid, diethylenetriaminepentacetic acid, methanediphosphonic acid, sodium hexametaphosphate and mixtures thereof.

38. The process of claim 35 where EDTA is added to the slurry in the amount of about one pound of EDTA per ton of ore.

39. The process of claim 35 wherein the oxygen-containing gas is air added to the slurry in an amount equivalent to provide about 10 lbs. to 100 lbs. of oxygen per ton of ore.

40. The process of claim 35 wherein said sulfurous acid is admixed in an amount to lower the pH of the ore slurry from about 3.0 to about 5.0.

41. The process of claim 35 comprising adding the $SO_2$ to the ore slurry over a period of time of about 0.5 hour to 2 hours.

42. The process of claim 35 comprising contacting said ore slurry and the anion exchange resin in a plurality of stages with the ion exchange resin flowing in countercurrent direction to said slurry.

43. The process of claim 35 comprising maintaining the temperature of the ore slurry during sulfurous acid leaching at about 95° F. to 105° F.

44. The process of claim 35 comprising leaching the gold from the ore for about 5 to about 30 hours.

45. The process of claim 35 comprising leaching the gold from the ore for about 16 to 20 hours.

46. The process of claim 35 wherein the anion exchange resin is a strong base resin.

47. The process of claim 35 wherein the anion exchange resin is a weak base resin.

48. The process of claim 35 comprising recovering the gold values from the anion exchange resin by chemical stripping with an acidic thiourea solution, wherein said acidic thiourea solution contains about 10 grams per liter of thiourea and 25 grams per liter of hydrochloric acid.

49. The process according to claims 1 or 6 wherein the process is performed on a continuous basis.

50. The process according to claims 1 or 6 wherein the process is performed on a batch basis.

51. The process according to claims 1 or 6 wherein said ore is selected from the group consisting of ore concentrates, ore tailings and gold-containing materials.

52. A process for leaching gold values from gold-containing ores comprising first treating gold-containing ore with an agent to render gold values soluble in sulfurous acid and to render the gold values amenable to sulfurous acid leaching; and leaching said treated ore with sulfurous acid to recover said gold values.

* * * * *

UNITED STATES PATENT AND TRADEMARK OFFICE
CERTIFICATE OF CORRECTION

PATENT NO.   : 5,147,617
DATED        : September 15, 1992
INVENTOR(S)  : Freddie J. Touro; Tadeusz K. Wiewiorowski It is certified that error appears in the above-identified patent and that said Letters Patent is hereby corrected as shown below:

The title page should be deleted to appear as per attached title page.

Fig. 1 should be deleted to appear as shown on the attached sheet.

Column 1, line 19, change "A hydrogen" to --Hydrogen--.

Column 5, line 5, insert --between-- before "5".

Column 7, line 15, change "quickley" to --quickly--.

Column 9, line 36, change "agitate" to --agitated--.

Column 9, line 51, change "efficient" to --efficiency--.

Signed and Sealed this

Nineteenth Day of October, 1993

*Attest:*

BRUCE LEHMAN

*Attesting Officer*    *Commissioner of Patents and Trademarks*

United States Patent [19]

Touro et al.

[11] Patent Number: 5,147,617
[45] Date of Patent: Sep. 15, 1992

[54] PROCESS FOR RECOVERY OF GOLD FROM GOLD ORES USING A COMPLEXING PRETREATMENT AND SULFUROUS ACID LEACHING

[75] Inventors: Freddie J. Touro; Tadeusz K. Wiewiorowski, both of New Orleans, La.

[73] Assignee: Freeport-McMoRan Inc., New Orleans, La.

[21] Appl. No.: 703,853

[22] Filed: May 21, 1991

[51] Int. Cl.⁵ .................. C01G 7/00; C22B 3/06; C22B 11/06
[52] U.S. Cl. ...................... 423/27; 423/28; 423/36; 423/37; 423/39; 75/736
[58] Field of Search ............. 423/27, 28, 36, 37, 423/39; 75/736

[56] References Cited

U.S. PATENT DOCUMENTS

| | | | |
|---|---|---|---|
| 3,235,328 | 2/1966 | Lerner et al. | 423/60 |
| 4,289,532 | 9/1981 | Matson et al. | 75/105 |
| 4,552,589 | 11/1985 | Mason et al. | 75/105 |
| 4,662,938 | 5/1987 | Whitney et al. | 423/39 |
| 4,668,289 | 5/1987 | Langer, et al. | 423/27 |
| 4,723,998 | 2/1988 | O'Neil | 75/101 |
| 4,736,718 | 4/1988 | Bakshani et al. | 75/105 |
| 4,902,345 | 2/1990 | Ball et al. | 423/27 |
| 4,919,715 | 4/1990 | Smith et al. | 75/423 |
| 5,051,128 | 9/1991 | Kubo | 75/736 |
| 5,055,199 | 10/1991 | O'Neill, et al. | 423/29 |

FOREIGN PATENT DOCUMENTS 3740680 6/1989 European Pat. Off. ............. 423/27

Primary Examiner—Theodore Morris
Assistant Examiner—P. L. Hailey
Attorney, Agent, or Firm—Fisher, Christen & Sabol

[57] ABSTRACT

A process for recovering gold from gold-bearing ores includes the steps of forming a slurry of ground ore and treating the ore with an oxidizing and complexing agent such as hydrogen sulfide or a sulfide salt. A chelating agent, $SO_2$, air, and an anion exchange resin are added to the slurry to subject the ore to a simultaneous sulfurous acid leaching and anion exchange resin adsorption step in the presence of dissolved oxygen. The gold transfers to the resin which is then removed from the slurry. The gold is then separated from the resin by chemical stripping. Alternately, the ground ore is blended with an oxidizing agent such as calcium hypochlorite and then with a gold-complexing agent. The ore blend is slurried in water, with the addition of a chelating agent, $SO_2$, air and an anion exchange resin to effect the leaching and adsorption of gold values.

52 Claims, 1 Drawing Sheet